May 16, 1961  G. J. HOWARD, JR., ET AL  2,984,834
RETRACTABLE AND ROTATABLE SCANNING DEVICE
Filed July 30, 1957  3 Sheets-Sheet 1

INVENTORS
GEORGE J. HOWARD JR.
RODERICK L. SMITH
BY Jack N. McCarthy
AGENT

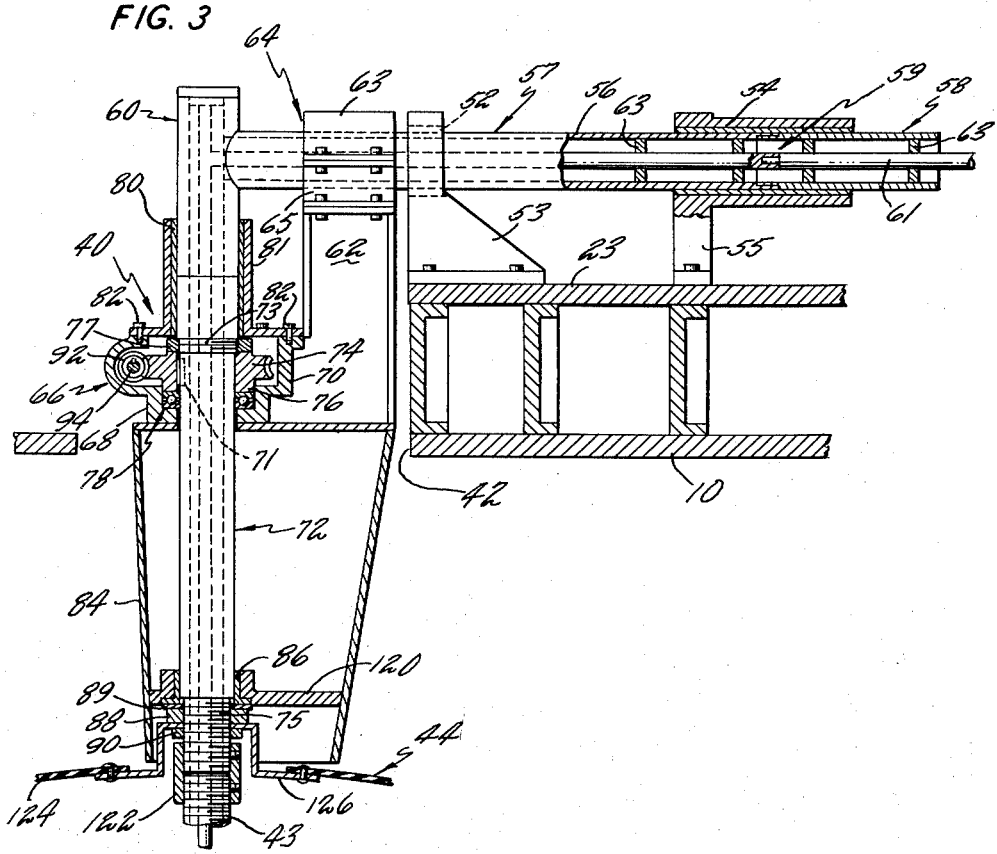

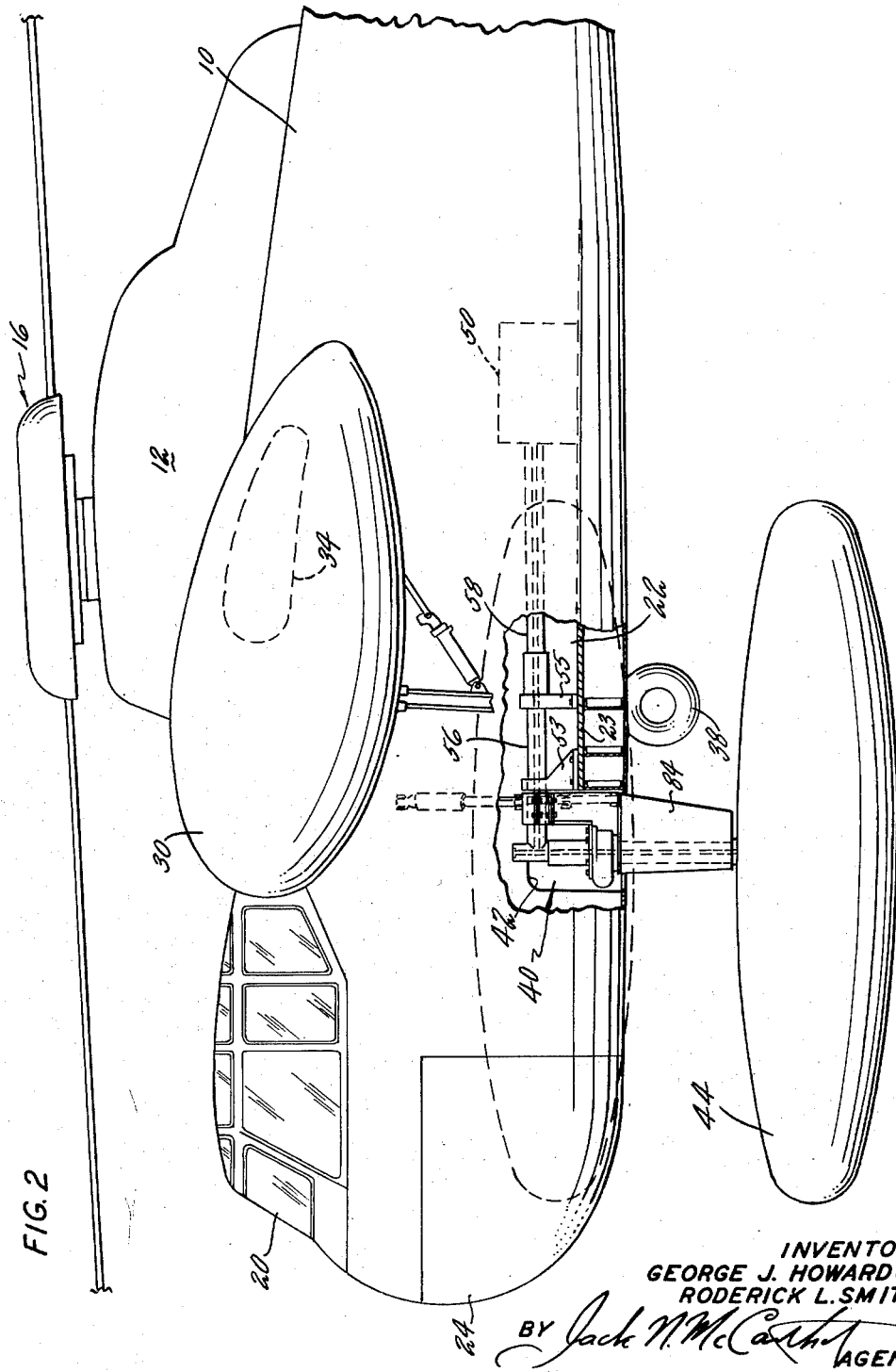

United States Patent Office 2,984,834
Patented May 16, 1961

2,984,834

RETRACTABLE AND ROTATABLE SCANNING DEVICE

George J. Howard, Jr., Fairfield, and Roderick L. Smith, Stratford, Conn., assignors to United Aircraft Corporation, East Hartford, Conn., a corporation of Delaware Filed July 30, 1957, Ser. No. 675,213

14 Claims. (Cl. 343—705)

This invention relates to means for mounting an antenna or other scanning device on an aircraft and more particularly on a helicopter in which the antenna or device can be actuated between an operating position beneath the helicopter and a stowed position on the side of the helicopter.

An object of this invention is to provide a mounting device for an antenna having a cigar-shaped housing, or one of generally cylindrical shape having streamlined ends, which will permit 360° uninterrupted azimuth scanning.

Another object of this invention is to provide means for mounting an antenna so that there will be minimum signal distortion by rotor blades and the fuselage.

A further object of this invention is to provide means for mounting an antenna which will require a minimum amount of conversion to existing aircraft.

Another object of this invention is to provide a substantially cylindrical housing for the antenna allowing pressurization of the signal transmission system.

A further object of this invention is to provide means for mounting an antenna which will have a minimum drag and pitching moment variation as the antenna rotates.

Another object of this invention is to provide an antenna mounting system which will permit the antenna to be mounted in a stationary position permitting high cruising speeds.

These and other objects and advantages will become apparent in connection with the detailed description of the invention shown in the accompanying drawings.

Fig. 2 is a side elevation of a helicopter with a portion of the fuselage broken away to show the mounting mechanism.

Fig. 3 is an enlarged view of the mounting mechanism showing its various parts in detail.

Figure 1:
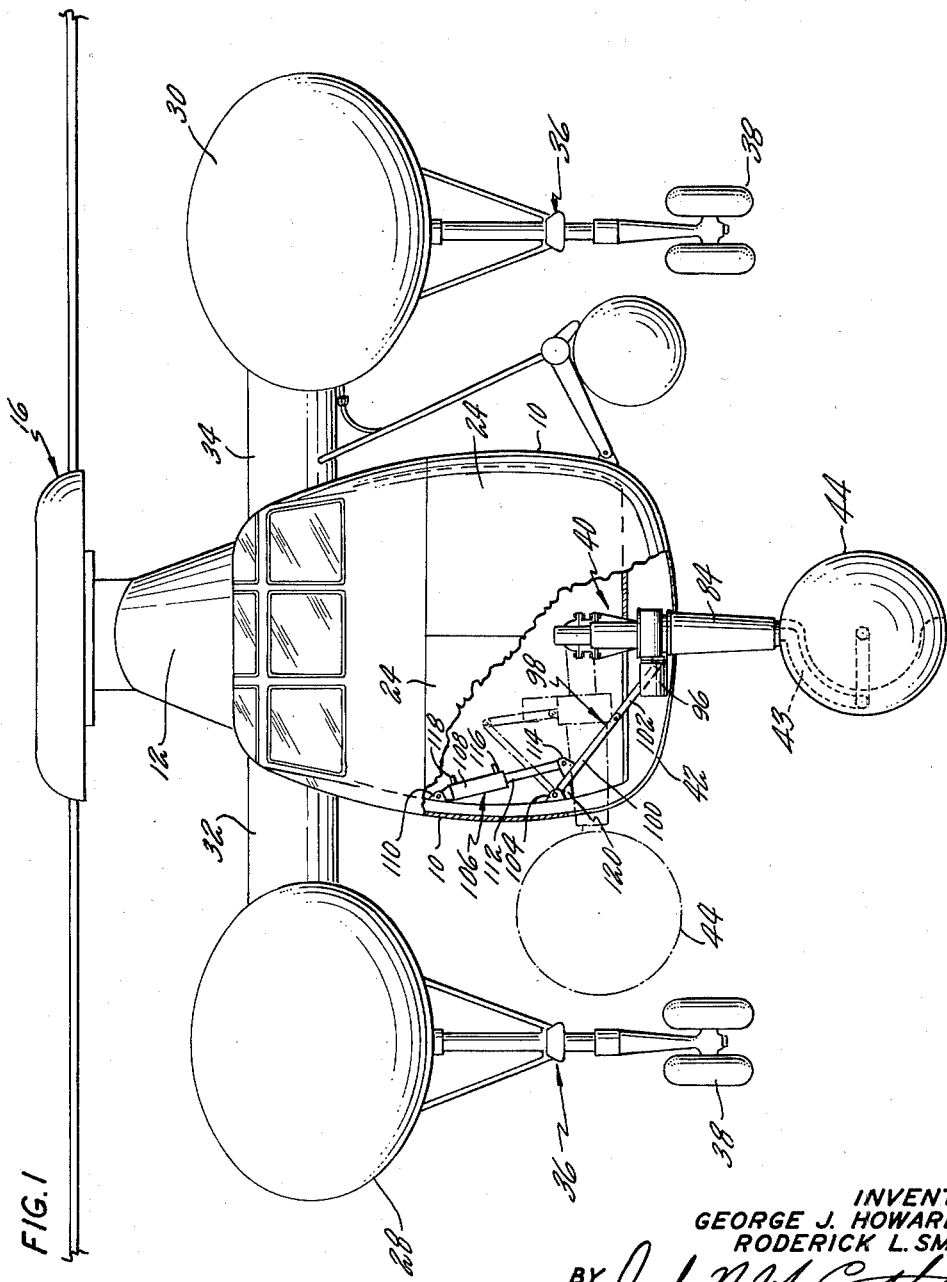
Fig. 1 is a front view of a helicopter showing the antenna housing in its operating position in solid lines and with the antenna housing being shown in phantom in its retracted position. A portion of the fuselage is broken away to show the mounting mechanism.

Referring to Figs. 1 and 2, the helicopter on which the invention is disclosed is generally shown in the patent to Gluhareff, United States Patent No. 2,755,038 for a Helicopter-Airplane With Engines Mounted on Fixed Wings. The helicopter comprises essentially an elongated fuselage 10 having a main rotor pylon 12 and a tail rotor pylon (not shown) on which are mounted the main rotor, generally indicated at 16, and the tail rotor (not shown), respectively. The fuselage has a pilot compartment 20 ahead of the main rotor pylon 12 which is located in the upper part of the nose section of the fuselage. The space beneath the pilot compartment extends well aft beneath the main rotor pylon and comprises the main cargo or passenger compartment 22 of the ship. Access to the cargo compartment may be gained through a pair of clam shell doors 24 in the nose section of the fuselage.

An engine is mounted in each of the engine nacelles 28 and 30 which are carried at the ends of the wings 32 and 34. These wings project laterally from the upper portion of the fuselage in the vicinity of the main rotor pylon 12 and have their surfaces faired into the fuselage.

This ship is supported on the ground by tricycle landing gear including main oleo struts 32 and wheels 38 which depend from the nacelles 28 and 30. A tail wheel (not shown) depending from the fuselage adjacent the tail rotor cone makes up the tricycle gear.

A radar antenna, or other scanning mechanism, mounting device 40 is attached in the compartment 22 of the ship on the floor 23, as viewed in Fig. 2, at a position between the nose of the aircraft and a point under the main rotor. A portion extends externally of the ship through an opening 42 in the fuselage to be connected with a housing 44. This mounting device provides for movement of the housing between its stowed and operating positions, provides for rotating the housing when it is in its operating position and provides means for connecting the antenna, or scanning device, in the housing to a detecting device 50. In the event radar is involved, a radar set is used.

The opening 42, through which a portion of the mounting device passes, extends from a point at the bottom of the fuselage, which permits the member depending from the mounting device to project downwardly to a point on the side of the fuselage which permits the same depending member to be moved to a position projecting sidewardly.

Two bearings 52 and 54 are mounted on members 53 and 55, respectively, on the floor 23 and spaced a short distance apart in which the outer hollow member 56 of the coaxial transfer line 57 is rotatably held. The coaxial transfer line shown is of the type having an outer hollow member 56 with an inner rod member 61 supported therein by spaced webs 63. In this type of line the inside diameter of the hollow member 56 and the outer diameter of the rod member 61 are maintained fixed throughout. These measurements are also maintained for all other connecting lines such as 58, 60 and 72. Bearing 52 is mounted adjacent the portion of floor 23 which stops just above the rear edge of opening 42 in the fuselage. The coaxial transfer line 57 ends within bearing 54 and another coaxial transfer line 58 extends therefrom to the radar set 50 mounted within the aircraft. At this point within bearing 54 the meeting ends of the coaxial transfer lines 57 and 58 are connected by a joint permitting rotation of line 57 with respect to line 58. This joint is diagrammatically shown at 59. The other end of the coaxial transfer line 57 extends through the bearing 52 and ends at a point over the opening 42 in the fuselage. Another section of coaxial transfer line 60 is connected to the line 57 at 90° thereto with one end extending towards the opening 42. A portion also extends above the line 57 (see Fig. 3) forming a chamber. A housing supporting arm 62 is connected to the outer member 56 of the coaxial transfer line 57 between bearing 52 and coaxial transfer line 60 and extends from said line 57 downwardly toward opening 42. This arm is attached to line 56 by a bracket 64 which comprises two sections 63 and 65. However, this arm may be attached by any other desirable means.

Extending forwardly from and fixed to the free end of arm 62 is a gear housing unit 66. This unit comprises a housing 68 fixed to the arm 62 at 70 such as by welding. Another section of coaxial transfer line 72 is positioned extending through housing 68 with one end being positioned adjacent the downwardly extending end of line 60 while the remainder of the line 72 extends through opening 42 and projects a distance below the bottom of the fuselage of the aircraft. Coaxial transfer line 72 is formed with a threaded section at 73 which is located adjacent the top of the housing 68. From threaded section 73 the line 72 is formed of a reduced outer diameter to a point adjacent its other end. At this point, the line is reduced in diameter to its end. This reduced section is threaded at 75 for a purpose to be hereinafter disclosed. Around the line 72 within the housing 68 a worm wheel 74 is attached by means of a key 71 to provide for rotation of this section of coaxial transfer line. A worm 92 is mounted for rotation in housing 68 on shaft 94 and meshes with worm wheel 74 which action will be hereinafter described. The worm wheel 74 is provided with a short shaft section 76. A lock nut 77 is located on the threaded section 73 above the upper end of shaft section 76 and a bearing unit 78 is located between the lower end of this shaft section 76 and the bottom of the housing 68. A bearing 80 is positioned around the meeting ends of coaxial transfer lines 72 and 60 and is mounted by means of a sleeve 81 on top of the gear housing 66 by bolts 82. This member also serves as a top for said housing. The two meeting ends of lines 72 and 60 are formed as a joint permitting rotation of line 72 with respect to line 60. This joint can be the same as that used at 59 for lines 57 and 58.

A motor 96 is fixed to the housing 68 and connected to shaft 94 to rotate it. The operation of this motor 96 can be in control of the pilot or radar operator. The antenna housing 44 and enclosed antenna 43 are permitted to rotate through the worm gear by motor 96 only when the antenna mounting and antenna are in their operating position. The antenna mounting device 40 is maintained in its downward position with the antenna housing and antenna in its operative position by the use of a link 98 consisting of two sections 100 and 102. One end of section 102 is attached to a bracket on gear housing 68 while its other end is pivotally attached to one end of the section 100. The other end of section 100 is pivotally attached to a bracket 104 on the side of the fuselage 10. The two-section link 98 is moved between its straight locked position, as shown in Fig. 1 in solid lines, and its open position, as shown in phantom in the same figure, by the use of hydraulic unit 106. With reference to the locked position of link 98, the link may have any type of positive lock or merely be held against a stop 120 by the hydraulic unit 106. This hydraulic unit consists of a cylinder 108 having one end pivotally connected to a bracket 110 on the fuselage 10 with a piston located therein having a piston rod 112 extending from the free end of the cylinder. The end of piston rod 112 extending from the cylinder is pivotally attached to a bracket 114 fixed to the section 100 of link 98. It can be seen that if fluid pressure and fluid drain are connected to conduits 116 and 118, respectively, of the cylinder 108, the mounting device will be rotated about line 57 to its retracted position (shown in phantom in Fig. 1). As the pressure line and drain line are reversed in their connection, it will be seen that the mounting device will be moved to its downward position. The control for properly connecting conduits 116 and 118 to either drain or pressure for actuation of the mounting device, which may be a valve of which many are known, can be positioned for operation by the pilot or radar operator. This control cannot be positioned to move the antenna to its stowed position while the antenna is rotating.

A streamlined strut 84 is attached to the bottom of arm 62 and housing 68 and encloses the downwardly extending portion of the coaxial transfer line 72 to a point adjacent the threaded section 75. A bearing 86 is provided where the line 72 passes through partition 120 in the strut 84. While a plain bearing 86 has been shown, other types of bearings can be used. A nut 88 is located on threaded section 75 below a washer 89 to hold line 72 in place along with worm wheel 74. The antenna housing 44 is attached to the end of the line 72 by the use of a holding nut 90 as shown in Fig. 3. If desired, other conventional holding means may be used. The antenna 43 located within the housing is attached to the free end of the coaxial transfer line 72 by a fixed joint. While this is represented by a locking sleeve 122 with two pins, other suitable means can be used.

The antenna housing 44 is formed of a resilient bag 124 fixed to a metal attachment plate 126. The housing is formed having fluid tight access means for installation and maintenance. The housing is pressurized along with the transfer lines. This may be done by any well known pressurizing means either through the transfer lines or directly into the housing.

While one embodiment of the invention has been shown and described herein, it will be evident that various changes may be made in the construction and arrangement of the parts without departing from the scope of the invention.

We claim:

1. In an aircraft having a fuselage and ground sustaining gear, a non-sustaining body adapted to be positioned in a flight operative position in a plane which is below the lowest part of the fuselage, said body having an elongated shape, a scanning device located in said body, means for positioning said body with its longitudinal axis parallel with the longitudinal axis of the aircraft, means for moving the body to an aircraft landing position in a plane above the lowest point of the fuselage on the outside of said fuselage maintaining said parallel relationship, said body remaining externally of the fuselage at all times.

2. In an aircraft having a fuselage and landing gear, a housing adapted to be positioned in its operative position in a plane which is below the lowest part of the landing gear when the gear is extended, said housing having a generally cylindrical shape with streamlined ends, a scanning device located in said housing for receiving a signal, a scanning detector in said fuselage, means for moving the housing to a plane above the lowest point of the fuselage on the outside of said fuselage, said housing remaining externally of the fuselage at all times, means for rotating said housing and scanning device when positioned in its operative position, and means for directing a signal detected by said scanning device to said scanning detector.

3. In an aircraft having a fuselage, a housing adapted to be positioned in its operative position in a plane which is below the fuselage, said housing having a generally cylindrical shape with streamlined ends, a scanning device located in said housing, means for moving the housing to a position to the side of said fuselage, said housing remaining externally of the fuselage at all times, and means for rotating said housing and scanning device when positioned in its operative position.

4. In an aircraft having a fuselage, a housing, means for positioning said housing in an operative position in a plane which is below said fuselage, said housing having a generally cylindrical shape with streamlined ends, a scanning device located in said housing, means for rotating said housing and scanning device when positioned in its operative position, means for moving the housing to a position to the side of said fuselage, said housing remaining externally of the fuselage at all times.

5. In an aircraft having a fuselage, a housing, means for positioning said housing in an operative position in a plane which is below said fuselage, said housing having a generally cylindrical shape with streamlined ends, a scanning device located in said housing, a detecting device located in said fueslage, means for rotating said housing and scanning device when positioned in its operative position, said positioning means having means for directing a signal detected by said scanning device to said detecting device, means for moving the housing to a position to the side of said fuselage, said housing remaining externally of the fuselage at all times.

6. In an aircraft having a fuselage, a housing located externally of said fuselage, means for positioning said housing in an operative position below said fuselage, said positioning means including an arm extending from within said fuselage through an opening in said fuselage, said opening extending from a point on the bottom of said fuselage to a point on the side thereof, a scanning device located in said housing, means connected to said positioning means for rotating said housing and scanning device when positioned in its operative position, means connected to said positioning means for moving the arm in the opening from a downward position to a position extending to the side of said fuselage, said housing remaining externally of the fuselage at all times.

7. In an aircraft having a fuselage, a housing located externally of said fuselage, means for positioning said housing in an operative position below said fuselage, said positioning means including an arm extending from within said fuselage through an opening in said fuselage, said opening extending from a point on the bottom of said fuselage to a point on the side thereof, said housing having an elongated shape, a scanning device located in said housing, means connected to said positioning means for rotating said housing and scanning device when positioned in its operative position, means connected to said positioning means for moving the arm in the opening from a downward position to a position extending to the side of said fuselage when the longitudinal axis of the housing is parallel to the longitudinal axis of the fuselage, said housing remaining externally of the fuselage at all times.

8. In an aircraft, a rotating scanning device including a housing, said housing being generally cylindrical in shape with each end being formed of streamlined cross section, means mounting said device for movement between an operating position below said aircraft to a stowed position at the side of said aircraft, a scanning device detector, said last named means including a coaxial transfer line extending from the scanning device to said detector.

9. In an aircraft having a fuselage; a rotating scanning device including a housing; said fuselage having an opening extending from a point at the bottom of said fuselage to a point at the side of said fuselage; means extending through said opening mounting said device for movement between an operating position below said fuselage to a stowed position at the side of said fuselage; said mounting means including a first section of coaxial transfer line rotatably mounted in said fuselage, a second section of coaxial transfer line connected to one end of said first section and extending towards said opening, and a third section of coaxial transfer line extending from said second section rotatably mounted in relation thereto; said scanning device being connected to the free end of said third section externally of said fuselage; a scanning device detector located in said fuselage; a fourth section of coaxial transfer line connecting the free end of said first section to said detector.

10. In an aircraft having a fuselage, rotating scanning device including a housing; said fuselage having an opening extending from a point at the bottom of said fuselage to a point at the side of said fuselage; means extending through said opening mounting said device for movement between an operating position below said fuselage to a stowed position at the side of said fuselage; said mounting means including a first section of coaxial transfer line rotatably mounted in said fuselage on an axis substantially parallel to the longitudinal axis of said fuselage, a second section of coaxial transfer line connected to one end of said first section and extending towards said opening, and a third section of coaxial transfer line extending from said second section rotatably mounted in relation thereto; said scanning device being connected to the free end of said third section externally of said fuselage; a scanning device detector located in said fuselage; a fourth section of coaxial transfer line connecting the free end of said first section to said detector; means for rotating said scanning device around said first section of coaxial transfer line.

11. In an aircraft having a fuselage; a rotating scanning device including a housing; said fuselage having an opening extending from a point at the bottom of said fuselage to a point at the side of said fuselage; means extending through said opening mounting said device for movement between an operating position below said fuselage to a stowed position at the side of said fuselage; said mounting means including a first section of coaxial transfer line rotatably mounted in said fuselage, a second section of coaxial transfer line connected to one end of said first section and extending towards said opening, and a third section of coaxial transfer line extending from said second section rotatably mounted in relation thereto; said scanning device being connected to the free end of said third section externally of said fuselage; a scanning device detector located in said fuselage; a fourth section of coaxial transfer line connecting the free end of said first section to said detector; means for rotating said scanning device with said third section of coaxial transfer line.

12. In an aircraft having a fuselage; a rotating scanning device including a housing; said fuselage having an opening extending from a point at the bottom of said fuselage to a point at the side of said fuselage; means extending through said opening mounting said device for movement between an operating position below said fuselage to a stowed position at the side of said fuselage; said mounting means including a first section of coaxial transfer line rotatably mounted in said fuselage, a second section of coaxial transfer line connected to one end of said first section and extending towards said opening, and a third section of coaxial transfer line extending from said second section rotatably mounted in relation thereto; said scanning device being connected to the free end of said third section externally of said fuselage; a scanning device detector located in said fuselage; a fourth section of coaxial transfer line connecting the free end of said first section to said detector; means for rotating said scanning device around said first section of coaxial transfer line between its operating position and stowed position.

13. In an aircraft having a fuselage, a housing located externally of said fuselage, a scanning device located in said housing, means connected to said fuselage for mounting said housing, said fuselage having an opening, said mounting means including an arm, said arm extending from within said fuselage through said opening in said fuselage, said housing being connected to said arm to move therewith, said opening extending from a point on the bottom of said fuselage to a point on the side thereof, means connected to said mounting means for moving the arm in the opening from a downward position to a position extending to the side of said fuselage, said housing remaining externally of the fuselage at all times.

14. In an aircraft having a fuselage, a housing located externally of said fuselage, a scanning device located in said housing, means connected to said fuselage for mounting said housing, said fuselage having an opening, said mounting means including an arm, said arm extending from within said fuselage through said opening in said fuselage, said housing being connected to said arm to move therewith, said opening extending from a point on the bottom of said fuselage to a point on the side thereof, means connected to said mounting means for moving the arm in the opening from a downward position to a position extending to the side of said fuselage, said housing remaining externally of the fuselage at all times, and means connected to said positioning means for rotating said housing when said arm is in a downward position.

References Cited in the file of this patent

UNITED STATES PATENTS

| | | |
|---|---|---|
| 1,857,888 | Stout | May 10, 1932 |
| 2,122,214 | Reid | June 28, 1938 |
| 2,184,260 | Sutton | Dec. 19, 1939 |
| 2,389,997 | Pontius et al. | Nov. 27, 1945 |
| 2,681,991 | Marco et al. | June 22, 1954 |
| 2,737,853 | Gravenhorst et al. | Mar. 13, 1956 |

FOREIGN PATENTS

| | | |
|---|---|---|
| 307,746 | Germany | Oct. 16, 1917 |